United States Patent
Eichenauer et al.

(10) Patent No.: US 6,806,318 B2
(45) Date of Patent: Oct. 19, 2004

(54) ABS MOLDING MATERIALS WITH ENHANCED WORKING PROPERTIES

(75) Inventors: Herbert Eichenauer, Dormagen (DE); Peter Krüger, Leverkusen (DE); Edgar Leitz, Dormagen (DE); Harry Staratschek, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/975,277

(22) Filed: Oct. 10, 2001

(65) Prior Publication Data

US 2002/0115797 A1 Aug. 22, 2002

Related U.S. Application Data

(63) Continuation-in-part of application No. 09/424,094, filed as application No. PCT/EP98/02919 on May 18, 1998, now abandoned.

(30) Foreign Application Priority Data

May 30, 1997 (DE) .......................... 197 22 791

(51) Int. Cl.⁷ ...................... C08F 255/00; C08F 257/00
(52) U.S. Cl. ...................................... 525/315; 525/316
(58) Field of Search .................................. 525/315, 316

(56) References Cited

U.S. PATENT DOCUMENTS

| 4,120,851 A | 10/1978 | Chi et al. ............... 260/880 R |
| 4,415,708 A | 11/1983 | Matsumura et al. ........ 525/316 |
| 4,478,982 A | 10/1984 | Matsumura et al. ........ 525/316 |

FOREIGN PATENT DOCUMENTS

WO   WO 98/54238   * 12/1998

OTHER PUBLICATIONS

Patent Abstracts of Japan, vol. 006, No. 063 (C–099), Apr. 22, 1982 & JP 57 005710 A, (Simitomo Naugatuck Co LTD), Jan. 12, 1982.

* cited by examiner

*Primary Examiner*—Jeffrey Mullis
(74) *Attorney, Agent, or Firm*—Jill Denesvich; Godfried R. Akorli

(57) ABSTRACT

Thermoplastic molding composition characterized in that the polymer proportion soluble in dichloromethane has a $c_{50}$ value of acrylonitrile of $\geq 28$ wt. % and a chemical distribution ($c_{90}-c_{10}$ value) of the acrylonitrile of $\geq 5$ wt. % is disclosed. The composition is characterized by its improved processability by extrusion and thermoforming.

7 Claims, No Drawings

ABS MOLDING MATERIALS WITH ENHANCED WORKING PROPERTIES

This application is a Continuation-in-Part of application Ser. No. 09/424,094, filed Nov. 18, 1999 now abandoned is a national stage application of PCT/EP98/02919, filed May 18, 1998.

FIELD OF THE INVENTION

The invention concerns thermoplastic molding compositions and more particularly compositions containing graft polymers

SUMMARY OF THE INVENTION

Thermoplastic molding composition characterized in that the polymer proportion soluble in dichloromethane has a $c_{50}$ value of acrylonitrile of $\geq 28$ wt. % and a chemical distribution ($c_{90}$–$c_{10}$ value) of the acrylonitrile of $\geq 5$ wt. % is disclosed. The composition is characterized by its improved processability by extrusion and thermoforming.

BACKGROUND OF THE INVENTION

Thermoplastic resins of the ABS type have been used for many years for the production of all kinds of moulded parts (see e.g. Ullmann's Encyclopedia of Industrial Chemistry, 5th Edition, Vol. A21, pages 652–653, VCH, Weinheim, 1992).

Apart from injection molding, a common form of processing for such thermoplastic resins is extrusion, the extrusion stage (e.g. production of sheets) often being followed by a thermoforming stage (production of three-dimensional moulded parts).

Materials used for processing by extrusion and thermoforming are required to have good melt elasticity whilst maintaining a good surface finish and good mechanical properties (e.g. toughness) of the thermoformed parts.

Moreover, it is important that the appropriate materials are easily obtainable (production without great technical complexity) and have an uncomplicated constitution (no components that are expensive or difficult to obtain).

Thermoplastic resin molding compositions have now been found which have the required properties and meet the requirements mentioned in that they have a special content of incorporated acrylonitrile and, in particular, a special chemical distribution of the incorporated acrylonitrile.

DETAILED DESCRIPTION OF THE INVENTION

The present invention provides thermoplastic resin molding compositions, characterized in that the polymer proportion soluble in dichloromethane has a $C_{50}$ value of acrylonitrile of $\geq 28$ wt. %, preferably 30 to 40 wt. %, more preferably 32 to 35 wt. % and a chemical distribution ($c_{90}$–$c_{10}$ value) of the acrylonitrile of $\geq 5$ wt. %, preferably 6 to 25 wt. %, more preferably 7.5 to 20 wt. % and most preferably 10 to 15 wt. %.

The invention also provides molding compositions comprising at least one polymer component selected from A) a graft rubber prepared by polymerization of
  A1) 25 to 70 parts by wt., preferably 35 to 65 parts by wt. of one or more monomers, at least one of which is acrylonitrile, onto
  A2) 30 to 75 parts by wt., preferably 35 to 65 parts by wt. of one or more rubber bases with a glass transition temperature of $\leq 0°$ C. with a $c_{50}$ value of acrylonitrile of $\geq 30$ wt. %, preferably 31 to 40 wt. %, more preferably 32 to 35 wt. % (based on the total graft shell in each case) and with a chemical distribution ($c_{90}$–$c_{10}$ value) of the acrylonitrile of $\geq 5$ wt. %, preferably 6 to 25 wt. %, more preferably 7.5 to 20 wt. % and most preferably 10 to 15 wt. %, and B) a rubber-free thermoplastic vinyl resin, obtained by radical polymerization of acrylonitrile and styrene and/ or α-methylstyrene with a $c_{50}$ value of acrylonitrile of $\geq 28$ wt. %, preferably 30 to 40 wt. %, more preferably 32 to 35 wt. % and with a chemical distribution ($c_{90}$–$c_{10}$ value) of the acrylonitrile of $\geq 5$ wt. %, preferably 6 to 25 wt. %, more preferably 7.5 to 20 wt. % and most preferably 10 to 15wt. %.

The molding compositions according to the invention are characterized by improved processability by extrusion and thermoforming compared with well known ABS molding compositions.

Particularly preferred molding compositions according to the invention are those which, apart from conventional graft rubbers, contain thermoplastic resin component B in proportions of 35 to 90 wt. %, preferably 45 to 80 wt. %.

Graft rubbers A) within the meaning of the invention are the products obtained during the graft polymerization of monomers A.1) in the presence of rubber A.2), whereby the above-mentioned chemical distribution of the incorporated acrylonitrile must be maintained.

Monomers A.1) are preferably mixtures of
  A.1.1) 50 to 99 parts by wt. of vinyl aromatics and/or vinyl aromatics substituted on the nucleus (such as, for example, styrene, α-methylstyrene, p-methylstyrene, p-chlorostyrene) and/or methacrylic acid ($C_1$–$C_4$) alkyl esters (such as, e.g., methylmethacrylate, ethylmethacrylate) and
  A.1.2) 1 to 50 parts by wt. of vinyl cyanides (unsaturated nitriles such as acrylonitrile and methacrylonitrile) and optionally (meth)acrylic acid ($C_1$–$C_8$) alkyl esters (such as, e.g. methylmethacrylate, n-butylacrylate, t-butylacrylate) and/or unsaturated carboxylic acids (such as maleic acid) and/or derivatives (such as anhydrides and imides) of unsaturated carboxylic acids (for example, maleic anhydride and N-phenylmaleinimide).

Preferred monomers A.1.1) are styrene, α-methylstyrene and methylmethacrylate, preferred monomers A.1.2) are acrylonitrile, maleic anhydride, N-phenylmaleinimide and methylmethacrylate, whereby acrylonitrile must necessarily be used as a monomer component in graft polymerization.

Particularly preferred monomers are A.1.1) styrene and A.1.2) acrylonitrile.

Rubber bases A.2) suitable for graft polymers A) are, for example, diene rubbers, EPM and EPDM rubbers, i.e. composed of ethylene/propylene and optionally small quantities of a non-conjugated diene (such as norbornene, norbornadiene), acrylate, polyurethane, silicone, chloroprene, and ethylene/vinyl acetate rubbers, provided said rubbers are in the emulsion form.

Preferred rubber bases A.2) are diene rubbers (e.g. based on butadiene, isoprene etc.) or mixtures of diene rubbers or copolymers of diene rubbers or mixtures thereof with other copolymerizable monomers (e.g. according to A.1.1) and A.1.2)), provided that their glass transition temperatures are below $0°$ C.

Pure polybutadiene rubber and butadiene/styrene copolymer rubbers and butadiene/acrylonitrile copolymer rubbers are particularly preferred.

Further particularly preferred rubber bases A.2) are acrylate rubbers, preferably polymers of acrylic acid alkyl esters, optionally with up to 40 wt. % (based on A.2) of other polymerizable ethylenically unsaturated monomers. The preferred polymerizable acrylates include $C_1$–$C_8$ alkyl esters, for example, methyl-, ethyl-, butyl-, n-octyl and 2-ethylhexyl esters; halogen alkyl esters, preferably halogen $C_1$–$C_8$ alkyl esters, such as chloroethylacrylate, and mixtures of said monomers.

For the purpose of cross-linking, monomers with more than one polymerizable double bond may be copolymerized. Preferred examples of cross-linking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as, e.g., ethylene glycol dimethacrylate, allylmethacrylate; polyunsaturated heterocyclic compounds such as, e.g., trivinyl- and triallylcyanurate; polyfunctional vinyl compounds, such as di- and trivinylbenzenes; and also triallyl phosphate and diallylphthalate.

Preferred crosslinking monomers are allylmethacrylate, ethylene glycol dimethacrylate, diallylphthalate and heterocyclic compounds containing at least 3 ethylenically unsaturated groups.

Particularly preferred crosslinking monomers are the cyclic monomers triallylcyanurate, triallylisocyanurate, trivinylcyanurate, triacryloylhexahydro-s-triazine, triallylbenzenes. The quantity of crosslinking monomers is preferably 0.02 to 5, particularly 0.05 to 2 wt. %, based on the graft base A.2).

In the case of cyclic crosslinking monomers with at least 3 ethylenically unsaturated groups, it is advantageous to limit the quantity to less than 1 wt. % of the graft base A.2).

Preferred "other" polymerizable ethylenically unsaturated monomers, apart from the acrylates, which may be used optionally for the preparation of the graft base A.2), are e.g. acrylonitrile, styrene, α-methylstyrene, acrylamides, vinyl $C_1$–$C_6$ alkyl ethers, methylmethacrylate, butadiene. Acrylate rubbers preferred as graft base A.2) are emulsion polymers having a gel content of at least 50 wt. %.

Further suitable graft bases according to A.2) are silicone rubbers with graft-active sites such as those described in DE-A 37 04 657, DE-A 37 04 655, DE-A 36 31 540 and DE-A 33 61 539.

The gel content of graft base A.2) is 30 to 95 wt. %, preferably 40 to 90 wt. %, more preferably 45 to 85 wt. % (measured according to the wire cage method in toluene, compare Houben-Weyl, Methoden der Organischen Chemie, Makromolekulare Stoffe, part 1, page 307 (1961), Thieme Verlag Stuttgart).

The $d_{50}$ of the rubber base A.2) is generally 100 to 600 nm, preferably 150 to 500 nm, more preferably 200 to 400 nm.

The $d_{50}$ is the diameter such that 50 wt.-% of the particles have a diameter of less than $d_{50}$. It may be determined by an ultracentrifuge measurement (W. Scholtan, H. Lange, Kolloid Z. u Z. Polymere 250 (1972), pages 782 to 796).

The graft rubbers A are prepared preferably by radical emulsion polymerization.

The compounds normally used as molecular weight regulators, such as, e.g. mercaptans or terpinols or dimeric α-methylstyrene, may be used in the preparation of the graft rubbers A.

Practically all types of emulsifier (anionic, cationic and nonionic emulsifiers) are suitable as emulsifiers, anionic emulsifiers being used in preference.

Suitable anionic emulsifiers are, for example, sodium, potassium or ammonium salts of long-chain fatty acids with 10 to 20 carbon atoms, e.g. potassium oleate, salts of the disproportionated abietic acid, salts of long-chain benzene sulphonates, salts of long-chain sulphonic acids, e.g. the sodium salts of $C_9$–$C_{18}$ alkylsulphonic acid mixtures and salts of dicarboxylic acids based on cyclic hydrocarbon frameworks according to DE-A 36 39 904 and DE-A 39 13 509.

The reaction temperatures selected may be any temperatures at which the initiator compounds used yield radicals to a sufficient extent for initiating and maintaining the polymerization reaction. This temperature range is approximately between 30° C. and 120° C., preferably between 45° C. and 100° C., more preferably between 50 and 90° C.

Suitable initiators for the preparation of A) and B) are all the substances acting as radical formers. Examples thereof are inorganic and organic peroxides, e.g. $H_2O_2$, di-tert.-butylperoxide, cumene hydroperoxide, dicyclohexyl percarbonate, tert.-butylhydroperoxide, p-menthane hydroperoxide, azo initiators such as, e.g., azobisisobutyronitrile, inorganic persalts such as ammonium, sodium or potassium persulphate, potassium perphosphate, sodium perborate and redox systems which are composed of a normally organic oxidising agent and a reducing agent, heavy metal ions preferably also being present in the reaction medium (see H. Logemann in Houben-Weyl, Methoden der organischen Chemie, volume 14/1, pages 263–297).

Preferred initiators are ammonium, sodium or potassium persulphate and redox systems of an organic peroxide and an organic reducing agent. Particularly preferred initiators are potassium persulphate or redox systems of cumene hydroperoxide and/or tert.-butylhydroperoxide and ascorbic acid and/or ascorbic acid salt.

The heterogeneous incorporation of acrylonitrile into the graft shell (broad chemical distribution) required according to the invention is known in principle. It may be achieved, e.g., if, during the graft polymerization reaction, the value for the monomer ratio required for a homogeneous constitution on account of copolymerization parameters is not maintained throughout the reaction period.

The rubber-free thermoplastic vinyl resin component B) includes one or more specially constituted polymers obtained by radical polymerization of monomer mixtures of styrene and acrylonitrile, α-methylstyrene and acrylonitrile or of styrene, α-methylstyrene and acrylonitrile, whereby these may contain further comonomers in smaller quantities (up to about 15 wt. %).

Suitable monomers of such kind are, for example, acrylic acid ($C_1$–$C_8$) alkyl esters (e.g. n-butylacrylate, tert.-butylacrylate, ethylhexylacrylate), methacrylic acid ($C_1$–$C_8$) alkylesters (e.g. methylmethacrylate, ethylmethacrylate), unsaturated carboxylic acids including their derivatives (such as anhydrides or imides) (e.g. acrylic acid, methacrylic acid, maleic acid, maleic anhydride, N-phenylmaleinimide).

In order to obtain the improvement in processability according to the invention by extrusion and thermoforming, the thermoplastic vinyl resin component B) must have a special constitution in terms of the chemical uniformity to the effect that the acrylonitrile is not incorporated homogeneously, but the resins have a broad chemical distribution.

Vinyl resins of such a constitution are known, in principle. They are obtained e.g. if, during polymerization of the resins, the value for the monomer ratio required for a homogeneous constitution on account of copolymerization parameters is not maintained throughout the reaction period.

Particularly suitable vinyl resins B) according to the invention are those in the preparation of which the monomers styrene (a) and acrylonitrile (b) or α-methylstyrene (a) and acrylonitrile (b), or styrene (a) and α-methylstyrene (a) and acrylonitrile (b) are metered into the reaction zone of at least one reactor in such a way that the weight ratio (a):(b) during the course of the co- or terpolymerization reaction assumes an increasing or a decreasing value, but not a constant value.

Suitable resins according to the invention preferably have a $c_{50}$ value of acrylonitrile of $\geq 30$ wt. %, preferably 31 to 40 wt. %, more preferably 32 to 35 wt. %, and a chemical distribution ($c_{90}$–$c_{10}$ value) of the acrylonitrile of $\geq 5$ wt. %, preferably 6 to 25 wt. %, more preferably 7.5 to 20 wt. % and most preferably 10 to 15 wt. % is obtained.

The $c_{50}$, $c_{90}$ and $c_{10}$ values are defined in close analogy to the corresponding d values used for the characterization of particle size distribution as described in W. Scholtan, H. Lange, Kolloid Z. u. Z. Polymere 250 (1972), pages 782 to 796 and may be determined by HPLC using gradient elution (see. e.g. G. Glöckner, Gradient HPLC of Copolymers and Chromatographic Cross-Fractioning, Springer-Verlag, Berlin-Heidelberg, 1991).

The distribution of acrylonitrile in the polymer portion soluble in dichloromethane is determined. $c_{50}$ is the acrylonitrile content (in wt.-%) such that 50 wt.-% of the soluble polymer portion has an acrylonitrile content of less than $c_{50}$. Accordingly, 50 wt.-% of the soluble polymer portion has an acrylonitrile content of greater than $c_{50}$.

By analogy, $c_{90}$ is that acrylonitrile content such that 90 wt.-% of the soluble polymer portion has an acrylonitrile content of less than $c_{90}$, and $c_{10}$ is that acrylonitrile content such that 10 wt.-% of the soluble polymer portion has an acrylonitrile content of less than $c_{10}$.

The difference $c_{90}$–$c_{10}$ ($c_{90}$ minus $c_{10}$) is a measure for the uniformity or non-uniformity of the distribution of acrylonitrile in the polymer. Polymers with a small $c_{90}$–$c_{10}$ value have a mostly uniform acrylonitrile incorporation and are said to have a narrow chemical distribution (of acrylonitrile). Suitable components A and B according to the invention, on the other hand, have a large $c_{90}$–$c_{10}$ value, hence a mostly non-uniform acrylonitrile incorporation and are said to have a broad chemical distribution.

Apart from the chemical non-uniformity described above, the vinyl polymer resins B) preferably have weight average molecular weights $M_w$ (determined by light scattering or sedimentation) of 20,000 to 500,000, preferably 50,000 to 400,000, more preferably 60,000 to 300,000.

In principle, the vinyl resins B) may be prepared according to all the processes of radical polymerization such as emulsion, suspension, solution or bulk polymerization.

The weight ratio A:B is 2:1 to 1:4, preferably between 1:1 and 1:2. Higher A:B ratios lead to an insufficient flow behaviour and reduced stiffness, whilst A:B ratios lower than 1:4 bring about an unsatisfactory low temperature toughness.

The molding compositions according to the invention may also contain further known additives in the conventional or necessary quantities. Without any claim to completeness, mention may be made here of stabilisers (e.g. sterically hindered phenols and thioethers or phosphite compounds as synergists), conventional pigments (carbon black, metal oxides etc.), mould release agents (e.g. pentaerythritol tetrastearate,), flow improvers (ethylene diamine bisstearylamide), fillers and reinforcing agents (e.g. glass fibres and carbon fibres), flame retardants (e.g. tetrabromobisphenol A), antidrip agents (e.g. tetrafluoroethylene polymers) and antistatic agents (e.g. polyalkylene ethers).

The molding compositions according to the invention may be prepared by mixing the constituents in a known way and melt-compounding or melt-extrusion at elevated temperatures, preferably at 200 to 260° C., in conventional devices such as internal kneaders, extruders or twin shaft screws. The molding compositions according to the invention are particularly suitable for the production of parts by extrusion (e.g. sheets and films) followed by thermoforming.

The invention also provides the use of the molding compositions described for the production of moulded parts by extrusion and by thermoforming.

EXAMPLES

1. Constituents

A.I. Graft rubber prepared by emulsion polymerization of 30.6 parts by weight of styrene and 14.4 parts by weight of acrylonitrile in the presence of 55 parts by weight (calculated as solid) of a polybutadiene latex produced by a conventional method ($d_{50}$=423 nm, gel content=81 wt. %) with 0.5 parts by weight of potassium persulphate as initiator, the monomers being metered within 4 hours to the rubber latex in such a way that the styrene metering takes place uniformly and continuously (25% of the total quantity per hour in each case) and the acrylonitrile metering takes place in decreasing amounts (40% of the total quantity in the first hour, 30% of the total quantity in the second hour, 20% of the total quantity in the third hour and 10% of the total quantity in the fourth hour).

$c_{50}$ value of acrylonitrile in the dichloromethane-soluble polymer proportion=32.1 wt. %, chemical distribution of the acrylonitrile ($c_{90}$–$c_{10}$ value)=12.4 wt. %.

A.II (Comparison):

Graft rubber prepared by emulsion polymerization of 30.6 parts by weight of styrene and 14.4 parts by weight of acrylonitrile in the presence of 55 parts by weight (calculated as solid) of a polybutadiene latex produced by a conventional method ($d_{50}$=423 nm, gel content=81 wt. %) with 0.5 parts by weight of potassium persulphate as initiator, the monomers being metered uniformly and continuously to the rubber latex within 4 hours (25% of the total quantity of styrene and acrylonitrile in the first, second, third and fourth hour in each case).

$c_{50}$ value of acrylonitrile in the dichloromethane-soluble polymer proportion=32.0 wt. %, chemical distribution of the acrylonitrile ($c_{90}$–$c_{10}$ value)=3.2 wt. %.

B.I. Styrene/acrylonitrile copolymer with a styrene: acrylonitrile weight ratio of 68:32 and an average molecular weight $M_w \approx 110{,}000$, prepared by emulsion polymerization whereby, within 4 hours, 17 parts by weight of styrene and 12.8 parts by weight of acrylonitrile are polymerised in the first hour, 17 parts by weight of styrene and 9.6 parts by weight of acrylonitrile within the second hour, 17 parts by weight of styrene and 6.4 parts by weight of acrylonitrile within the third hour, and 17 parts by weight of styrene and 3.2 parts by weight of acrylonitrile within the fourth hour, using potassium persulphate ($K_2S_2O_8$) as initiator.

$c_{50}$ value of acrylonitrile in the dichloromethane-soluble polymer proportion=31.9 wt. %, chemical distribution of the acrylonitrile ($c_{90}$–$c_{10}$ value)=13.7 wt. %.

B.II. (Comparison):

Styrene/acrylonitrile copolymer with a styrene: acrylonitrile weight ratio of 68:32 and an average molecular weight $M_w \approx 112{,}000$, prepared by emulsion polymerization whereby, within 4 hours, 17 parts by weight of styrene and 8 parts by weight of acrylonitrile are polymerised uniformly in each case, with the use of potassium persulphate ($K_2S_2O_8$) as initiator.

$c_{50}$ value of acrylonitrile in the dichloromethane-soluble polymer proportion=32.0 wt. %, chemical distribution of the acrylonitrile ($c_{90}$–$c_{10}$ value)=2.2 wt. %.

2. Preparation and Testing of the Molding Compositions According to the Invention and of the Comparison Molding Compositions The components A and B are melted and homogenised in the quantities given in Table 1 together with additives (2 parts by weight of pentaerythritol tetrastearate and 0.1 part by weight of silicone oil, in each case per 100 parts by weight of A+B) in an internal kneader at temperatures between 180 and 230° C. Sheets are prepared from the granules.

As a high melt elasticity is required for good thermoforming properties of ABS molding compositions (corresponding to a low loss factor tan δ), the thermoforming behaviour may be determined by determining the loss factor tan δ at low frequencies (corresponding to a low shear rate occurring during thermoforming) at a temperature of 170° C. (instrument: RDA II from Rheometrics, plate/plate arrangement).

In addition, extruded sheets (30 cm×26 cm) of some products are thermoformed to a paraboloid, the thermoforming properties and nature of the surface being assessed.

The mechanical properties are assessed by the behaviour during impact. As can be seen from Table 2, only the molding compositions according to the invention have a low loss factor tan δ at low frequencies (ω=0.02 rad/sec) required for good thermoforming properties; the practical thermoforming behaviour and surface finish of the paraboloids produced are very good for the molding compositions according to the invention.

The thermoforming properties and the surface of the thermoformed parts are evaluated as follows:

++ very good
+ good
o average
− poor
− − very poor

TABLE 1

Compositions of the molding compositions examined

| Examples | A.I. (Parts by wt.) | A.II. (Parts by wt.) | B.I. (Parts by wt.) | B.II. (Parts by wt.) |
|---|---|---|---|---|
| 1 | 40 | — | 60 | — |
| 2 | 40 | — | — | 60 |
| 3 | — | 40 | 60 | — |
| 4 (comparison) | — | 40 | — | 60 |
| 5 | 30 | — | 70 | — |
| 6 | — | 30 | 70 | — |
| 7 (comparison) | — | 30 | — | 70 |

TABLE 2

Evaluation of the molding compositions

| Example Behaviour | tan δ at ω = 0.02 rad/sec | Behaviour Surface | | |
|---|---|---|---|---|
| | | during thermo-forming | finish of thermo-formed part | during impact |
| 1 | 1.1 | ++ | ++ | tough |
| 2 | 1.4 | ++ | ++ | tough |
| 3 | 1.2 | ++ | ++ | tough |
| 4 (comparison) | 1.9 | 0 | n.m. | tough |
| 5 | 1.5 | ++ | ++ | tough |
| 6 | 1.6 | + | ++ | tough |
| 7 (comparison) | 2.3 | − | n.m. | tough | n.m. = not measured

What is claimed is:

1. A thermoplastic molding composition comprising at least one polymer component selected from A) a graft rubber prepared by polymerization of A1) 35 to 65 parts by wt. of one or mom monomers, at least one of which is acrylonitrile, onto A2) 35 to 65 parts by wt. of one or more rubber bases with a glass transition temperature of ≦0° C. with a $C_{50}$ value of acrylonitrile of the graft shell is 31 to 40 wt % (based on the total graft shell in each case) and with a chemical distribution ($C_{90}$–$C_{10}$ value) of the acrylonitrile of 6 to 25 wt %, and B) a rubber-free thermoplastic vinyl resin obtained by radical polymerization of a monomer combination of acrylonitrile and styrene and/or α-methylstyrene with a $C_{50}$ value of acrylonitrile of 30 to 40 wt. % and a chemical distribution ($C_{90}$–$C_{10}$ value) of the acrylonitrile of 6 to 25 wt. %.

2. The thermoplastic molding composition according to claim 1, containing 10 to 65 wt. % of a graft rubber A) and 90 to 35 wt % of at least one rubber-tree vinyl rosin component B).

3. The molding composition according to claim 1, wherein A1 is a mixture of styrene and acrylonitrile.

4. The molding composition according to claim 2, wherein A2) is at least one member selected from the group consisting of polybutadiene; butadiene/styrene copolymer rubber and butadiene/acrylonitrile copolymer rubber.

5. The composition of claim 1 comprising 10 to 65 wt. % of said A and 90to 35wt % of said B.

6. A method of using the composition of claim 1 in molding articles comprising thermoforming parts from extruded sheets.

7. The molding composition according to claim 1, wherein B) is a copolymer of styrene and acrylonitrile.

* * * * *